US010467636B2

(12) United States Patent
Gopal et al.

(10) Patent No.: US 10,467,636 B2
(45) Date of Patent: Nov. 5, 2019

(54) IMPLEMENTING RETAIL CUSTOMER ANALYTICS DATA MODEL IN A DISTRIBUTED COMPUTING ENVIRONMENT (71) Applicant: Tata Consultancy Services Limited, Mumbai (IN)

(72) Inventors: Radhakrishnan Gopal, Chennai (IN); Janardhan Santhanam, Chennai (IN); Sunitha Mayelil Muralidharn, Kochi (IN)

(73) Assignee: Tata Consultancy Services Limited, Mumbai (IN)

( * ) Notice: Subject to any disclaimer, the term of this patent is extended or adjusted under 35 U.S.C. 154(b) by 490 days.

(21) Appl. No.: 15/078,774

(22) Filed: Mar. 23, 2016

(65) Prior Publication Data

US 2016/0292700 A1    Oct. 6, 2016

(30) Foreign Application Priority Data

Apr. 1, 2015 (IN) .......................... 1403/MUM/2015

(51) Int. Cl.
*G06Q 10/00* (2012.01)
*G06Q 30/02* (2012.01)
(52) U.S. Cl.
CPC .............................. *G06Q 30/0201* (2013.01)
(58) Field of Classification Search
None
See application file for complete search history.

(56) References Cited

U.S. PATENT DOCUMENTS 7,698,163 B2 * 4/2010 Reed ...................... G06Q 30/02
                                                          703/2
7,865,389 B2 * 1/2011 Shan ...................... G06F 17/18
                                                          705/7.29

(Continued)

FOREIGN PATENT DOCUMENTS

CN         103886074 A      6/2014
WO    WO 2013/158840 A1    10/2013

OTHER PUBLICATIONS

Gulipalli, Gopinadh, 5 Steps to Data Cleansing of Customer Data, Sep. 29, 2015, Invensis, https://www.invensis.net/blog/data-processing/5-steps-data-cleansing-customer-data/ , p. 1-3.*

(Continued)

*Primary Examiner* — Joseph M Waesco
(74) *Attorney, Agent, or Firm* — Finnegan, Henderson, Farabow, Garrett & Dunner LLP (57) ABSTRACT The disclosure relates generally to managing data of a customer in a distributed computing environment and more particularly to a system and a method for implementing retail customer analytics data model in a distributed computing environment. Customer data, transaction data, and interaction data of a customer in a form of facts and dimensions is received from a plurality of sources. A relationship in the customer data is identified by checking the facts and the dimensions in the plurality of sources. Based on the relationship, a unified customer profile is created. Further, a customer identity is generated by performing an identity matching on the unified customer profile. The transaction data received from the plurality of sources is merged to create a unified transaction model. Subsequently, the customer identity is linked with the unified transaction model and the interaction data to generate a plurality of customer analytics records. Further, the plurality of cus- (Continued)

tomer analytics records are analyzed to obtain the behavior of the customer.

12 Claims, 4 Drawing Sheets

(56) References Cited

U.S. PATENT DOCUMENTS

| | | | | |
|---|---|---|---|---|
| 8,060,398 | B2* | 11/2011 | Canning | G06Q 10/0639 |
| | | | | 705/7.29 |
| 8,392,363 | B2* | 3/2013 | Rangadass | G06Q 10/06 |
| | | | | 707/610 |
| 2006/0004746 | A1* | 1/2006 | Angus | G06F 16/254 |
| 2008/0270363 | A1* | 10/2008 | Hunt | G06F 16/2462 |
| 2008/0294996 | A1* | 11/2008 | Hunt | G06Q 30/02 |
| | | | | 715/739 |
| 2009/0006156 | A1* | 1/2009 | Hunt | G06Q 10/063 |
| | | | | 705/7.11 |
| 2009/0018996 | A1* | 1/2009 | Hunt | G06Q 30/02 |
| 2009/0083119 | A1* | 3/2009 | Mided | G06Q 10/0631 |
| | | | | 705/7.12 |
| 2012/0173472 | A1* | 7/2012 | Hunt | G06Q 20/0855 |
| | | | | 706/46 |
| 2012/0323656 | A1* | 12/2012 | Leach | G06Q 30/0239 |
| | | | | 705/14.17 |
| 2012/0323663 | A1* | 12/2012 | Leach | G06Q 30/0239 |
| | | | | 705/14.25 |
| 2013/0226657 | A1 | 8/2013 | Bohe et al. | |
| 2013/0246215 | A1* | 9/2013 | Faith | G06Q 30/06 |
| | | | | 705/26.7 |
| 2013/0317886 | A1 | 11/2013 | Kiran et al. | |
| 2014/0032259 | A1 | 1/2014 | Lafever et al. | |
| 2014/0074599 | A1* | 3/2014 | Rappoport | G06Q 30/0251 |
| | | | | 705/14.51 |
| 2014/0129306 | A1* | 5/2014 | Rappoport | G06Q 30/0212 |
| | | | | 705/14.14 |
| 2014/0129313 | A1* | 5/2014 | Rappoport | G06Q 30/0224 |
| | | | | 705/14.25 |
| 2014/0236678 | A1* | 8/2014 | Akerman | G06F 16/9537 |
| | | | | 705/7.34 |
| 2014/0297363 | A1* | 10/2014 | Vemana | G06Q 30/0201 |
| | | | | 705/7.29 |
| 2014/0365301 | A1* | 12/2014 | Rappoport | G06Q 30/0253 |
| | | | | 705/14.51 |
| 2015/0032503 | A1* | 1/2015 | Chander | G06Q 30/0201 |
| | | | | 705/7.29 |
| 2015/0032675 | A1* | 1/2015 | Huehn | G06Q 50/01 |
| | | | | 706/12 |
| 2017/0083386 | A1* | 3/2017 | Wing | G06F 9/542 |

OTHER PUBLICATIONS

"TCS PeriVista Shopper, 360° Customer insights for Retail", TCS Retail PeriVista Shopper Solution Brochune, Tata Consultancy Services Limited, pp. 1-4, (2014).

"Mastering Big Data: The Next Big Leap for Master Data Management", Cognizant 20-20 insights, Cognizant, pp. 1-6, (2013).

* cited by examiner

IMPLEMENTING RETAIL CUSTOMER ANALYTICS DATA MODEL IN A DISTRIBUTED COMPUTING ENVIRONMENT

CROSS REFERENCE TO RELATED APPLICATIONS

This U.S. patent application claims priority under 35 U.S.C. § 119 to: India Application No. 1403/MUM/2015, filed on Apr. 1, 2015. The entire contents of the aforementioned application are incorporated herein by reference.

TECHNICAL FIELD

The present disclosure in general relates to managing data of a customer in a distributed computing environment. More particularly, the present disclosure relates to a system and a method for implementing retail customer analytics data model in a distributed computing environment.

BACKGROUND

With advent in technology, it has become convenient to customers to have interactions with others and to make purchases at online stores. Typically, customers interact with others, e.g., retailers using online stores, kiosks, mobile applications, and so on. Further, the customers may interact with others using social media such as Facebook®, MySpace®, Twitter®, and so on. Generally, the customers have the interactions for searching product information, price comparison, product ratings, and to leave feedback. Further, the customers make multiple purchases using the online stores and leave feedback.

The inventors here have recognized several technical problems with such conventional systems, as explained below. With increase in use of social media and the online stores by the customers across the globe, the data generated by the customers has increased enormously. As known, the data generated using different channels in the social media may be unstructured and may pose challenge in understanding the data. With increasing volume of the data, it has become difficult to detect patterns of the transactions and the interactions corresponding to the transactions made by the customers. Processing of the huge volume of the data is tedious and time consuming.

SUMMARY

Embodiments of the present disclosure present technological improvements as solutions to one or more of the above-mentioned technical problems recognized by the inventors in conventional systems. For example, in one implementation, a method for implementing retail customer analytics data model in a distributed computing environment is disclosed. The method comprises receiving, by a processor, customer data, transaction data, and interaction data of a customer from a plurality of sources. The customer data, the transaction data, and the interaction data are received in a form of facts and dimensions. A source of the plurality of sources comprises a plurality of channels facilitating the customer to perform one or more actions. The method further comprises identifying, by the processor, a relationship in the customer data by checking the facts and the dimensions in the plurality of sources. The method further comprises creating, by the processor, a unified customer profile for the customer based on the relationship identified. The method further comprises generating, by the processor, a customer identity by performing an identity matching on the unified customer profile. The method further comprises merging, by the processor, the transaction data received from the plurality of sources to create a unified transaction model. The method further comprises linking, by the processor, the customer identity with the unified transaction model and the interaction data to generate a plurality of customer analytics records. A customer analytics record of the plurality of customer analytics records represents an action performed by the customer in a channel of the plurality of channels. The customer analytics record comprises data indicating a metric related to behaviour of the customer. The method further comprises analyzing, by the processor, the plurality of customer analytics records to obtain the behaviour of the customer.

In one implementation, a system for implementing retail customer analytics data model in a distributed computing environment is disclosed. The system comprises a memory and a processor coupled to the memory. The processor executes program instructions stored in the memory to receive customer data, transaction data, and interaction data of a customer from a plurality of sources. The customer data, the transaction data, and the interaction data are received in a form of facts and dimensions. A source of the plurality of sources comprises a plurality of channels facilitating the customer to perform one or more actions. The processor further executes program instructions stored in the memory to identify a relationship in the customer data by checking the facts and the dimensions in the plurality of sources. The processor further executes program instructions stored in the memory to create a unified customer profile for the customer based on the relationship identified. The processor further executes program instructions stored in the memory to generate a customer identity by performing an identity matching on the unified customer profile. The processor further executes program instructions stored in the memory to merge the transaction data received from the plurality of sources to create a unified transaction model. The processor further executes program instructions stored in the memory to link the customer identity with the unified transaction model and the interaction data to generate a plurality of customer analytics records. A customer analytics record of the plurality of customer analytics records represents an action performed by the customer in a channel of the plurality of channels, wherein the customer analytics record comprises data indicating a metric related to behaviour of the customer. The processor further executes program instructions stored in the memory to analyze the plurality of customer analytics records to obtain the behaviour of the customer.

In one implementation, a non-transitory computer readable medium embodying a program executable in a computing device for implementing retail customer analytics data model in a distributed computing environment is disclosed. The program comprises a program code for receiving customer data, transaction data, and interaction data of a customer from a plurality of sources. The customer data, the transaction data, and the interaction data are received in a form of facts and dimensions. A source of the plurality of sources comprises a plurality of channels facilitating the customer to perform one or more actions. The program further comprises a program code for identifying a relationship in the customer data by checking the facts and the dimensions in the plurality of sources. The program further comprises a program code for creating a unified customer profile for the customer based on the relationship identified.

The program further comprises a program code for generating a customer identity by performing an identity matching on the unified customer profile. The program further comprises a program code for merging the transaction data received from the plurality of sources to create a unified transaction model. The program further comprises a program code for linking the customer identity with the unified transaction model and the interaction data to generate a plurality of customer analytics records. A customer analytics record of the plurality of customer analytics records represents an action performed by the customer in a channel of the plurality of channels. The customer analytics record comprises data indicating a metric related to behaviour of the customer. The program further comprises a program code for analysing the plurality of customer analytics records to obtain the behaviour of the customer.

It is to be understood that both the foregoing general description and the following detailed description are exemplary and explanatory only and are not restrictive of the invention, as claimed.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like/similar features and components.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a system and a method implementing retail customer analytics data model in a distributed computing environment. At first, customer data, transaction data, and interaction data of a customer may be received from a plurality of sources. The customer data, the transaction data, and the interaction data are received in a form of facts and dimensions. A source of the plurality of sources may comprise a plurality of channels facilitating the customer to perform one or more actions. In one example, the customer data, the transaction data, and the interaction data may be received in a predefined data structure. In another example, the customer data and the interaction data may be received as unstructured data. When the unstructured data is received, the unstructured data may be cleansed to convert into structured data.

After receiving the customer data, a relationship in the customer data may be identified by checking the facts and the dimensions in the plurality of sources. The customer data may comprise a plurality of attributes related to the customer. The plurality of attributes may comprise at least one of demographic, sociographic, and a psychographic. In one example, the relationship may be identified by matching at least one attribute from a source to another source in the plurality of sources. Based on the relationship identified, a unified customer profile for the customer may be created. Further, a customer identity may be generated by performing an identity matching on the unified customer profile.

For the transaction data received from the plurality of sources, the transaction data may be merged to create a unified transaction model. After obtaining the unified transaction model, the customer identity may be linked with the unified transaction model and the interaction data to generate a plurality of customer analytics records. A customer analytics record of the plurality of customer analytics records may represent an action performed by the customer in a channel of the plurality of channels. The customer analytics record may comprise data indicating a metric related to behaviour of the customer. Subsequently, the plurality of customer analytics records may be analysed to obtain the behaviour of the customer. The plurality of customer analytics records may be stored in such a way that the plurality of customer analytics records caters to multiple types of workloads of consuming applications.

While aspects of described system and method for implementing retail customer analytics data model in a distributed computing environment may be implemented in any number of different computing systems, environments, and/or configurations, the embodiments are described in the context of the following exemplary system.

Figure 1:
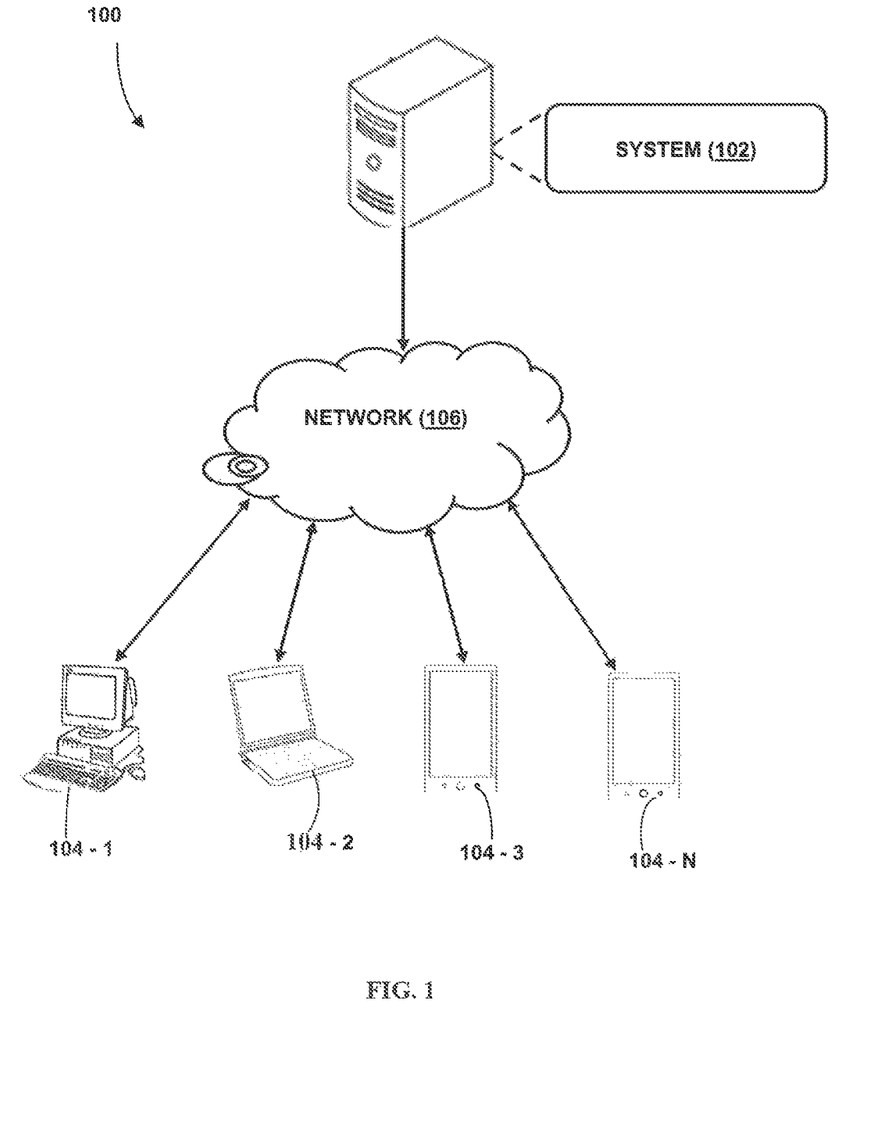
FIG. 1 illustrates a network implementation of a system for implementing retail customer analytics data model in a distributed computing environment, according to some embodiments of the present disclosure.

Referring now to FIG. 1, a network implementation 100 of a system 102 for implementing retail customer analytics data model in a distributed computing environment is illustrated, in accordance with an embodiment of the present disclosure. The system 102 may receive customer data, transaction data, and interaction data of a customer from a plurality of sources. The customer data, the transaction data, and the interaction data may be received in a form of facts and dimensions. A source of the plurality of sources comprises a plurality of channels facilitating the customer to perform one or more actions. The system 102 may identify a relationship in the customer data by checking the facts and the dimensions in the plurality of sources. The system 102 may create a unified customer profile for the customer based on the relationship identified. The system 102 may generate a customer identity by performing an identity matching on the unified customer profile. The system 102 may merge the transaction data received from the plurality of sources to create a unified transaction model. Subsequently, the system 102 may link the customer identity with the unified transaction model and the interaction data to generate a plurality of customer analytics records. The system 102 may analyze the plurality of customer analytics records to obtain the behaviour of the customer. The system 102 may store the customer analytics records in such a way that it is optimized for varying workloads of data consumption.

The present disclosure may be implemented in a distributed computing environment such as Hadoop which has core components of Hadoop Distributed File System (HDFS) for data storage and a processing framework called MapReduce to work on the data. The HDFS is a distributed, scalable, fault-tolerant file system. Each node in a Hadoop instance typically has a single name node, and there may be a cluster of data nodes to form a HDFS cluster. It will be appreciated the HDFS stores very large files across multiple machines and it achieves data reliability by replicating data across multiple data nodes with default replication value 3. It will be understood that the system 102 may be accessed by multiple users through one or more user devices 104-1, 104-2 ... 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
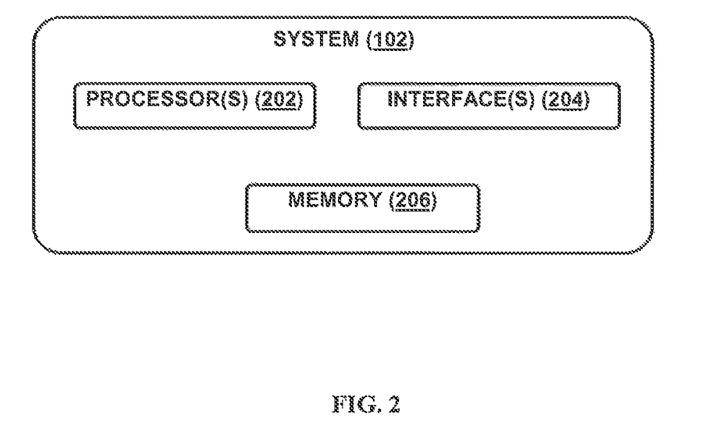
FIG. 2 illustrates the system, according to some embodiments of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, the user may use the client device 104 to access the system 102 via the I/O interface 204. The working of the system 102 may be explained in detail using FIG. 2 and FIG. 3. The system 102 may be used for implementing retail customer analytics data model in a distributed computing environment. In order to provide the retail customer analytics data model, the system 102 may receive customer data, transaction data, and interaction data of the customer from a plurality of sources. The customer data may correspond to details of the customer. In one example, the customer data may correspond to registration of the customer in a social media. In another example, the customer data may comprise details of the customer such as name, address, identity number, and so on. The customer may perform one or more actions on a source of the plurality of sources. For example, the customer may create an account on a social media with his details such as name, age, sex, and so on. The source may have plurality of channels. For instance, consider the social media as a source, the social media may have a plurality of channels such as Facebook®, Twitter®, LinkedIn®, and so on.

The customer data may comprise information such as name, age, address, and so on. As known, a customer may have one or more accounts on the plurality of sources. In one example, the customer may have a profile on social media platforms such as Facebook®, Twitter®, LinkedIn®, and so on. The customer may have provided his/her information to the social media service providers to maintain the account. Similarly, the customer may subscribe/enroll to various programs offered by retailers to obtain services. For example, the customer may subscribe to retailer's e-commerce website by registering himself with the retailer's e-commerce website. After creating the account, the customer may make purchases on the e-commerce website. For the customer, the e-commerce website may maintain a customer profile comprising the details of the customer and the purchases made. Based on a purchase pattern of the customer, the retailer may offer Loyalty points to the customer. Further, if the customer has been associated with the retailer for a long time, the retailer may maintain a Customer Relationship Management (CRM) with the customer to provide additional benefits to the customer. The customer profile data may be received from multiple enterprise data sources of a retailer.

As known, the customer may access the social media and retailer's e-commerce websites using web applications such as a web browser. Further, with advent in technology, the customer may access the social media and the retailer's e-commerce website using mobile applications available on smart phones. Based on the usage of the social media with the web browsers and the mobile applications, the customer data may be obtained. Furthermore, location of the customer accessing the mobile applications may also be obtained. The customer profile data present in the systems such as Loyalty, CRM, and web and mobile applications based on the registration by the customer may be received. Further, the customer data may comprise customer enrichment data received from a plurality of third party sources. In one example, the third party sources may correspond to databases such as government sources, private and/or public cloud servers storing the details of the customer. In another example, the third party sources may comprise databases such as Experian® and Acxiom®.

The transaction data may correspond to data of the customer's purchasing patterns on online stores, such as retailer's e-commerce websites. As discussed above, the customer may use the retailer's e-commerce websites to purchase products. Further, the customer may purchase the products at a Point of Sale (PoS). Further, the customer may make transactions to purchase products using the mobile applications. The data corresponding to the customer's use of e-commerce websites, purchase patterns and the services used to make the transactions are received as the transaction data. In one example, business driven partitioning may be used to ingest the transaction data. Specifically, the transaction data corresponding to previous transactions that could come after the audit process may be ingested in the staging area with new transaction data. The transaction data may be ingested using a partition identifier, typically using the date of the transaction.

The interactions data may correspond to feedback or comments provided by the customer in the plurality of sources. For example, consider the customer purchased a product from retailer's e-commerce website. The customer may write a review for the product on the retail website or may leave a comment on social media such as Twitter®. The comments left by the customer may be received from the source, i.e., Twitter®, and from retailer's website as the interaction data. The plurality of sources may include the social media such as Facebook®, Twitter®, MySpace®, and so on. In another example, the plurality of sources may include call centre logs, emails, blogs and external social media sources.

The system 102 may receive the customer data, the transaction data and the interaction data in a form of facts and dimensions. As known, the facts or fact tables comprises the data corresponding to a particular business process. Each row in the fact table may represent a single event having a measurement data associated with that event. For example, the transaction data for the customer may have customer purchases, customer service telephone calls and product returns. The fact table corresponding to the customer purchases may have information such as amount of the purchase, discounts applied on the product, and so on. The dimensions may correspond to the customer in a source. For example, the dimension may include the products the customer has purchased from the retailer. In one example, addition of new sources to the base information model is made flexible by assigning a source system identity for each and every source of customer profiles, transactions and interactions.

When the customer data, the transaction data and the interaction data are received, the facts and dimensions may be defined individually for the data received from the plurality of sources. For example, a retail POS transaction data may include the facts such as total number of items and amount, line item level details for each item bought, and so on. Further, context of the transaction may be captured as dimensions such as the store in which the transaction occurred, time of the transaction, and merchandize hierarchy of the items bought. In another example, a click stream entity may include URLs visited, items ordered, cart abandonment, and so on. Similarly, the facts and the dimensions from each of the plurality of sources may be received depending on availability of the data. If the data received is incomplete or irrelevant, then the data may be discarded. The incomplete data may be identified by performing error checking, exception handling and recovery of the data received.

For the customer data, the transaction, and the interaction data received from the plurality of sources, a relationship in the customer data may be identified. Each of the sources and its relationship to the customer may be represented by different facts and dimensions.

The customer data, the transaction data and the interaction data may be received in a predefined data structure. In one example, the predefined data structure may be a structured data. In some instances, the customer data and the interaction data may be received as unstructured data. This is because the customer details may be defined in multiple formats in each of the plurality of sources. Similarly, feedback of the customer from the plurality of channel may not be defined in a structured manner. Therefore, the unstructured data may have to be converted into structured data. The customer profile, transaction, interaction and social data may be ingested to a universal staging area before applying cleansing and transformation rules. In order to elaborate, a method 300 for converting the unstructured data into the structured data may be illustrated using FIG. 3. At first, the customer data 302, the transaction data 304 and the interaction data 306 may be received from the plurality of sources. At step 308, if the data received is in the structured format, then the data may re-formatted and standardized for further processing. If the data is in the unstructured data, then the unstructured data may need to be cleansed, and formatted. As discussed above, if the data received is incomplete or irrelevant, then the data may be discarded. The incomplete data may be identified by performing error checking, exception handling and recovery of the data received.

Figure 3:
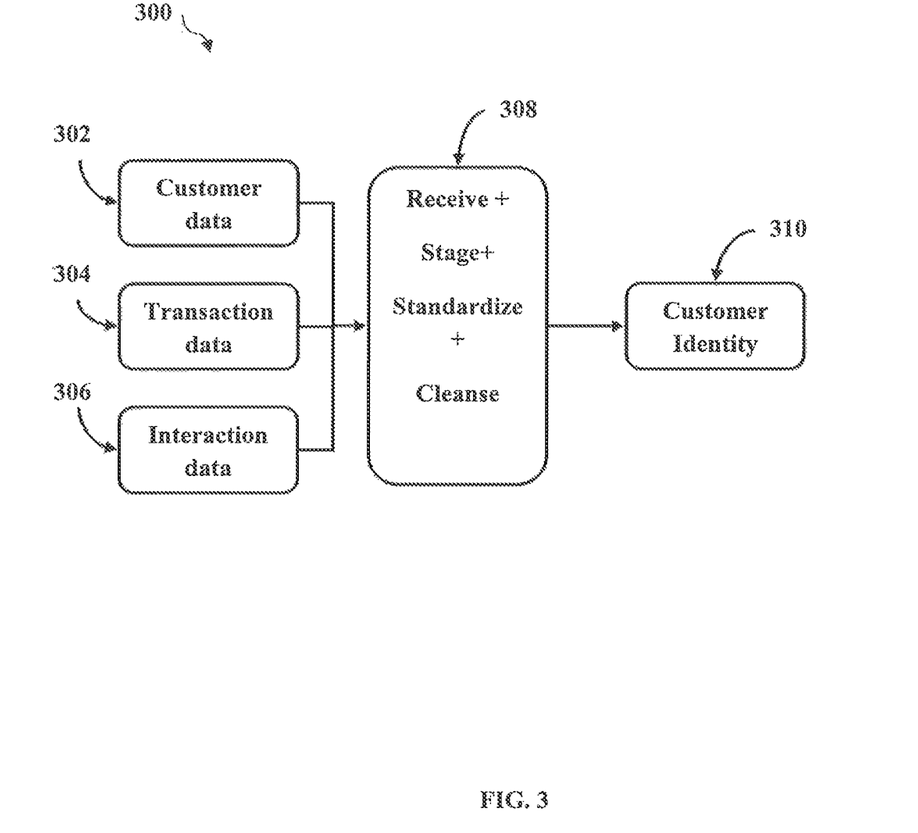
FIG. 3 shows a method for converting the unstructured data into the structured data, according to some embodiments of the present disclosure.

After cleansing and standardizing the data, the facts and the dimensions in the plurality of sources may be checked to create a unified customer profile for the customer. In order to create the unified customer profile, the system 102 may check common facts and dimensions received from the plurality of sources. If there exists duplicate facts and dimensions, the system 102 may remove the duplicates. After removing the duplicates, the system 102 may create the unified customer profile comprising the customer data from the plurality of sources. Subsequently, the system 102 may generate a customer identify by performing an identity matching on the unified customer profile, as shown at step 310. The customer identity may be generated by matching at least one attribute from a source to another source in the plurality of sources. For example, name of the customer from more than two channels in the plurality of sources may be matched to generate the customer identity. In another example, name of the customer and address of the customer may be matched to generate the customer identity for the customer.

The customer record in UPM comprises the customer identity (ID) and other details obtained by matching attributes from the plurality of sources. The attributes of the customer may include but not limited to email, address, date of birth, home, mobile, work phone numbers and so on. Unified profile model also maintains the source of customer profile attributes along with the history of changes.

Furthermore, the transaction data received from the plurality of channels of the plurality of sources may be merged to create a unified transaction model. As discussed, the transaction data may be received in the form the facts and dimensions. In order to create the unified transaction model, the facts and dimension received from the plurality of sources may be aggregated. Dimensions are flattened with facts in unified transaction model so performing analytic computations on this is very performance efficient in distributed computing framework rather than following snow flake data modelling.

After creating the customer identity and the merging the transaction data, the customer identity and the unified transaction model may be linked. The customer identity and the unified transaction model may be linked to obtain traceable transactions from a particular source. Upon linking the customer identity and the unified transaction model, the linked records may have customer ID associated with transaction header, transaction details and transaction payment details. Further, when the details of the transaction are received from a source, the customer id, e.g., Dot com id, Mobile customer id, Loyalty id may also be linked for cross reference.

Subsequently, the interaction data may be linked with the customer identity and the unified transaction model. After the customer identity is linked with the unified transaction model and the interaction data, a plurality of customer analytics records may be generated. A customer analytics record of the plurality of customer analytics records may represent an action performed by the customer in a channel of the plurality of channels. Further, the customer analytics record may comprise data indicating a metric related to behaviour of the customer. In other words, each record in the customer analytics record may correspond to the customer and each field may indicate a metric related to the customer. In order to generate the plurality of customer analytics records, text mining and natural language processing techniques may be applied on the social data and resultant data may be added to the customer analytics record. After generating the plurality of customer analytics records, the plurality of customer analytics records may be stored in the memory 206. Specifically, the plurality of customer analytics records is stored for analysing the plurality of customer analytics records to obtain the behaviour of the customer. In other words, the plurality of customer analytics records is stored for understanding the behaviour of the customer from various dimensions.

The plurality of customer analytics records may have base metrics and derived metrics. The base metrics may comprise the facts that correspond to the transaction data received from the plurality of sources. For example, the base metrics may have the transaction data such as, amount of the transaction, tender break-up details, and so on. The derived metrics may correspond to the metrics obtained after aggregating the unified transaction model and the interaction data. The derived metrics may include a summation of the transactions, average of transaction per month, transactions made over a period of time, average number of visits per month by the customer and so on. The plurality of customer analytics records may be generated to identify customer segments; recommendations to the customer and so on. Further, the derived metrics may include social metrics such as location, employment, and social influence specific metrics. Furthermore, the customer analytics records may include customer's sentiment and affinities about a particular brand, products and services offered by a retailer. Social activity subject area in the derived information model may have social media metrics at the individual customer level.

The customer analytics records may be generated for variety of metrics. For example, the customer analytics records may be generated for the metrics such as visit of the customer, value of the purchases made by the customer, spending behaviour of the customer and other metrics. In the metric related to the visit of the customer, frequency of the customer visiting a particular channel to make a transaction may be generated. In the metric of the value, quantity of purchases made, brand selected and a category of the purchases made may be derived. In the metric of the spending behaviour, purchases made in dollars, and tender breakup of the spending may be derived. In the other metrics, movement of the customer, metrics derived from social data, customer segments, relationship among the purchases may be derived.

After generating the plurality of customer analytics records, one or more metrics may be stored as a single customer record in a flattened data structure. The flattened data structure may be used for real-time processing of the queries to retrieve the metrics. The individual customer record in a flattened data structure comprises visit, basket, location, social and other customer metrics for plurality of time periods.

As discussed, the customer analytics records may be generated for variety of metrics. The metrics may be grouped by business hierarchy and may be categorized into one of a channel, merchandise, and location hierarchies. For example, the metrics may be generated for a merchandize to understand the purchases made in a month by the customer. As discussed above, the metrics may be categorized/grouped based on visit, basket and spend and the metrics may be computed for combinations of channel, merchandise and location hierarchies. The grouping of the metrics supports adhoc analysis when the data is stored in a distributed manner across multiple nodes machines.

Further, the metrics may be aggregated to enterprise level metrics aligned by business functions such as marketing and merchandizing. Further, the metrics may be aggregated to view from an enterprise perspective and an individual customer perspective.

The plurality of customer analytics records generated may be used for one or more purposes. For example, the plurality of customer analytics records may be used to create alerts to the customer. In another example, the plurality of customer analytics records may be used to generate reports for the enterprise. In another example, the plurality of customer analytics records may be used to process structured queries and data feeds to other applications. In another example, the plurality of customer analytics records may be used to create a dashboard for maintaining the data for security and authorization purposes.

As the metrics are stored both as flattened data structure and normalized data structures in the form of attribute groups of Visit, Basket and Spend along the hierarchies of channel, merchandise and location, the metrics supports both real time processing as well as adhoc analysis for the retrieval of metrics when the queries are processed in a distributed computing environment/storage.

Figure 4:
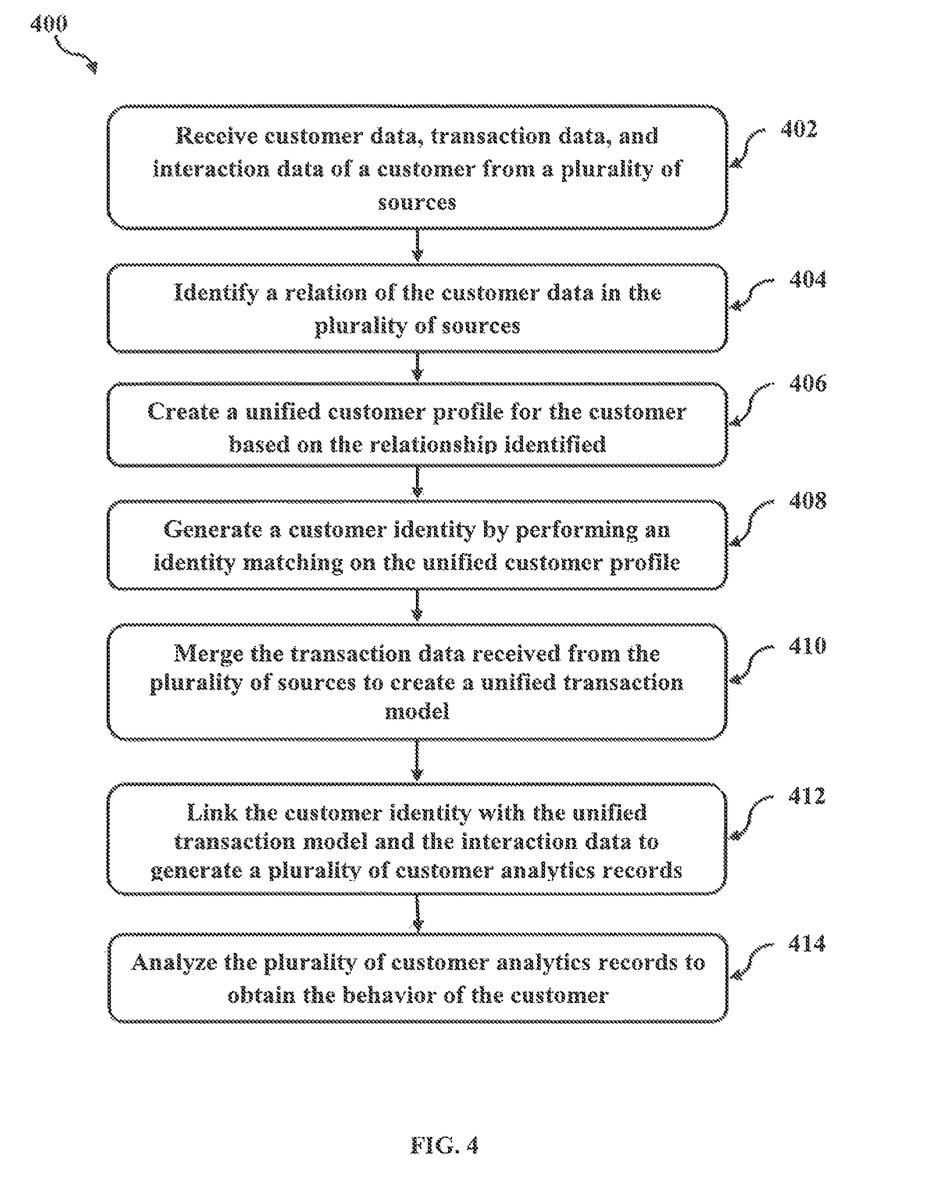
FIG. 4 shows a flowchart for implementing retail customer analytics data model in a distributed computing environment, according to some embodiments of the present disclosure.

Referring how to FIG. 4, a method 400 for implementing retail customer analytics data model in a distributed computing environment is shown, in accordance with an embodiment of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network, in a distributed computing environment, computer executable instructions may be located in both local and remote computer storage media, including memory storage devices.

The order in which the method 400 is described and is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method may be implemented in any suitable hardware, software, firmware, or combination thereof. However, for ease of explanation, in the embodiments described below, the method 400 may be implemented in the above-described system 102.

At step/block 402, customer data, transaction data, and interaction data of a customer may be received from a plurality of sources. The customer data, the transaction data, and the interaction data may be received in a form of facts and dimensions. A source of the plurality of sources may comprise a plurality of channels facilitating the customer to perform one or more actions.

At step/block 404, a relationship in the customer data may be identified by checking the facts and the dimensions in the plurality of sources.

At step/block 406, a unified customer profile for the customer may be created based on the relationship identified;

At step/block 408, a customer identity may be generated by performing an identity matching on the unified customer profile;

At step/block 410, the transaction data received from the plurality of sources may be merged to create a unified transaction model.

At step/block 412, the customer identity may be linked with the unified transaction model and the interaction data to generate a plurality of customer analytics records. A customer analytics record of the plurality of customer analytics records represents an action performed by the customer in a channel of the plurality of channels. The customer analytics record comprises data indicating a metric related to behaviour of the customer.

At step/block 414, the plurality of customer analytics records may be analyzed to obtain the behaviour of the customer.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for implementing retail customer analytics data model in a distributed computing environment, the method comprising:

receiving, by a processor, data of a customer from a plurality of sources; wherein the data comprises customer data, transaction data, and interaction data, wherein the customer data, the transaction data, and the interaction data are received in a form of facts and dimensions, and wherein a source of the plurality of sources comprises a plurality of channels facilitating the customer to perform one or more actions, wherein the transaction data corresponds to a plurality of purchasing patterns;

identifying, by the processor, a relationship in the customer data by checking the facts and the dimensions in the plurality of sources;

performing, by the processor, re-formatting and standardization of the data received, when the data received is in a structured format;

performing, by the processor, cleansing and formatting the data received by applying transformation rules, when the data received is in a unstructured format;

discarding, by the processor, the data received, when the data received is incomplete data, wherein incomplete data is identified by performing at least one of error checking, exception handling and a recovery of the data received;

creating, by the processor, a unified customer profile for the customer based on the relationship identified;

applying, by the processor, at least one of said unified customer profile, transaction data, and interaction data to a universal staging area;

generating, by the processor, a customer identity by performing an identity matching on the unified customer profile;

merging, by the processor, the transaction data received from the plurality of sources to create a unified transaction model, wherein the facts and the dimensions of the transaction data received from the plurality of sources are aggregated and the dimensions are flattened with the facts to create the unified transaction model;

linking, by the processor, the customer identity with the unified transaction model and the interaction data to generate a plurality of customer analytics records, wherein a customer analytics record of the plurality of customer analytics records represents an action performed by the customer in a channel of the plurality of channels, wherein the customer analytics record comprises data indicating a metric related to a behavior of the customer; and analyzing, by the processor, the plurality of customer analytics records to obtain the behavior of the customer.

2. The method of claim 1, wherein the customer data comprises a plurality of attributes related to the customer, wherein the plurality of attributes comprise at least one of demographic, sociographic, and psychographic.

3. The method of claim 2, wherein the relationship is identified by matching at least one attribute from a source to another source in the plurality of sources.

4. The method of claim 1, wherein the customer data comprises data corresponding to customer details, customer profile information, and customer enrichment data, wherein the customer details are collected from sources comprising Loyalty, CRM, and web and mobile applications based on a registration by the customer, wherein the customer profile information is obtained from social media data sources, and wherein the customer enrichment data is received from a plurality of third party sources.

5. The method of claim 1, wherein the transaction data comprises data from a plurality of channels, comprising Point of Sale (PoS), e-commerce and mobile applications.

6. The method of claim 1, wherein the interaction data comprises data from call center logs, emails, blogs and external social media sources.

7. The method for claim 1, further comprising querying the customer analytics records for retrieving the behavior based on the analysis.

8. A system for implementing retail customer analytics data model in a distributed computing environment, the system comprising:
- a memory; and
- a processor coupled to the memory, wherein the processor executes program instructions stored in the memory, to:
- receive data of a customer from a plurality of sources; wherein the data comprises customer data, transaction data, and interaction data, wherein the customer data, the transaction data, and the interaction data are received in a form of facts and dimensions, and wherein a source of the plurality of sources comprises a plurality of channels facilitating the customer to perform one or more actions, wherein the transaction data corresponds to a plurality of purchasing patterns;
- identify a relationship in the customer data by checking the facts and the dimensions in the plurality of sources;
- performing re-formatting and standardization of the data received, when the data received is in a structured format;
- performing cleansing and formatting the data received by applying transformation rules, when the data received is in a unstructured format;
- discarding the data received, when the data received is incomplete data, wherein incomplete data is identified by performing at least one of error checking, exception handling and a recovery of the data received;
- create a unified customer profile for the customer based on the relationship identified;
- apply at least one of said unified customer profile, transaction data, and interaction data to a universal staging area;
- generate a customer identity by performing an identity matching on the unified customer profile;
- merge the transaction data received from the plurality of sources to create a unified transaction model, wherein the facts and the dimensions of the transaction data received from the plurality of sources are aggregated and the dimensions are flattened with the facts to create the unified transaction model;
- link the customer identity with the unified transaction model and the interaction data to generate a plurality of customer analytics records, wherein a customer analytics record of the plurality of customer analytics records represents an action performed by the customer in a channel of the plurality of channels, wherein the customer analytics record comprises data indicating a metric related to a behavior of the customer; and
- analyze the plurality of customer analytics records to obtain the behavior of the customer.

9. The system of claim 8, wherein the customer data comprises a plurality of attributes related to the customer, wherein the plurality of attributes comprise at least one of demographic, sociographic, and psychographic.

10. The system of claim 9, wherein the relationship is identified by matching at least one attribute from a source to another source in the plurality of sources.

11. The system of claim 8, wherein the processor executes the program instructions to query the customer analytics records for retrieving the behavior based on the analysis.

12. A non-transitory computer readable medium embodying a program executable in a computing device for implementing retail customer analytics data model in a distributed computing environment, the program comprising:
- a program code for receiving customer data, transaction data, and interaction data of a customer from a plurality of sources, wherein the customer data, the transaction data, and the interaction data are received in a form of facts and dimensions, and wherein a source of the plurality of sources comprises a plurality of channels facilitating the customer to perform one or more actions wherein the transaction data corresponds to a plurality of purchasing patterns;
- a program code for identifying a relationship in the customer data by checking the facts and the dimensions in the plurality of sources;
- a program code for performing re-formatting and standardization of the data received, when the data received is in a structured format;
- a program code for performing cleansing and formatting the data received by applying transformation rules, when the data received is in a unstructured format;
- a program code for discarding the data received, when the data received is incomplete data, wherein incomplete data is identified by performing at least one of error checking, exception handling and a recovery of the data received;
- a program code for creating a unified customer profile for the customer based on the relationship identified;
- a program code for applying at least one of said unified customer profile, transaction data, and interaction data to a universal staging area;
- a program code for generating a customer identity by performing an identity matching on the unified customer profile;
- a program code for merging the transaction data received from the plurality of sources to create a unified transaction model, wherein the facts and the dimensions of the transaction data received from the plurality of sources are aggregated and the dimensions are flattened with the facts to create the unified transaction model;
- a program code for linking the customer identity with the unified transaction model and the interaction data to generate a plurality of customer analytics records, wherein a customer analytics record of the plurality of customer analytics records represents an action performed by the customer in a channel of the plurality of channels, wherein the customer analytics record comprises data indicating a metric related to a behavior of the customer; and
- a program code for analyzing the plurality of customer analytics records to obtain the behavior of the customer.

* * * * *